(12) United States Patent
Yang et al.

(10) Patent No.: US 11,303,419 B2
(45) Date of Patent: Apr. 12, 2022

(54) SEMI-STATIC HARQ-ACK CODEBOOK WITH MULTIPLE PDSCH TRANSMISSIONS PER SLOT

(71) Applicant: QUALCOMM Incorporated, San Diego, CA (US)

(72) Inventors: Yang Yang, San Diego, CA (US); Peter Pui Lok Ang, San Diego, CA (US); Wanshi Chen, San Diego, CA (US); Huilin Xu, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/375,520

(22) Filed: Apr. 4, 2019

(65) Prior Publication Data

US 2019/0312713 A1    Oct. 10, 2019

Related U.S. Application Data

(60) Provisional application No. 62/654,296, filed on Apr. 6, 2018.

(51) Int. Cl.
*H04L 5/00* (2006.01)
*H04W 72/04* (2009.01)
(Continued)

(52) U.S. Cl.
CPC ......... *H04L 5/0082* (2013.01); *H04B 7/0417* (2013.01); *H04B 7/0456* (2013.01);
(Continued)

(58) Field of Classification Search
CPC ... H04L 5/0082; H04L 5/0055; H04L 1/1861; H04L 5/001; H04L 5/0053; H04L 1/1812;
(Continued)

(56) References Cited

U.S. PATENT DOCUMENTS

2012/0039279 A1   2/2012  Chen et al.
2012/0269103 A1 * 10/2012  Papasakellariou .... H04L 1/1614
                                                          370/280
(Continued)

FOREIGN PATENT DOCUMENTS

EP         3480995 A1 *  5/2019  ........... H04L 1/1896
WO   WO-2018021881 A1 *  2/2018  ........... H04W 24/10

OTHER PUBLICATIONS

Kwak et al., "Method and Apparatus for Reporting Channel State Information in Mobile Communication System", Feb. 1, 2018, WIPO, WO 2018021881. (Year: 2018).*

(Continued)

*Primary Examiner* — Michael K Phillips
(74) *Attorney, Agent, or Firm* — Patterson & Sheridan, L.L.P.

(57) ABSTRACT

Certain aspects of the present disclosure relate generally to wireless communications systems, and more particularly, to techniques that may help reduce or eliminate ambiguity in acknowledging multiple physical downlink shared channel (PDSCH) transmissions in a single transmission time interval (TTI). According to aspects, a codebook with fewer fields than a number of PDSCH candidates may be used to provide acknowledgement/negative acknowledgement (ACK/NACK) feedback.

22 Claims, 11 Drawing Sheets

(51) Int. Cl.
    *H04B 7/0456* (2017.01)
    *H04B 7/0417* (2017.01)
(52) U.S. Cl.
    CPC ......... *H04L 5/0055* (2013.01); *H04W 72/042* (2013.01); *H04W 72/0446* (2013.01); *H04W 72/0493* (2013.01)
(58) Field of Classification Search
    CPC . H04L 1/1854; H04L 1/00; H04L 1/18; H04L 1/1864; H04L 1/1887; H04L 1/1896; H04L 1/1822; H04L 1/0073; H04L 5/0044; H04L 5/0091; H04L 5/0026; H04L 5/16; H04W 72/0493; H04W 72/042; H04W 72/0446; H04W 72/1289; H04B 7/0456; H04B 7/0417
    See application file for complete search history.

(56) References Cited

U.S. PATENT DOCUMENTS

| | | | |
|---|---|---|---|
| 2012/0320805 A1 | 12/2012 | Yang et al. | |
| 2018/0278373 A1* | 9/2018 | Wang | H04L 1/1854 |
| 2019/0199477 A1* | 6/2019 | Park | H04L 1/0067 |
| 2019/0313386 A1* | 10/2019 | Hwang | H04W 52/0219 |
| 2020/0358487 A1* | 11/2020 | Yang | H04L 5/0055 |
| 2021/0084622 A1* | 3/2021 | Choi | H04W 72/12 |

OTHER PUBLICATIONS

Ericsson: "On Remaining Issues on Carrier Aggregation", 3GPP Draft; R1-1802917 on Remaining Issues on Carrier Aggregation, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 26, 2018-Mar. 2, 2018, Feb. 17, 2018 (Feb. 17, 2018), 16 Pages, XP051398306, Retrieved from the Internet: URL: http://www.3gpp.org/ftp/tsg_ran/WG1_RL1/TSGR1_92/Docs/ [retrieved on Feb. 17, 2018].

International Search Report and Written Opinion—PCT/US2019/026046—ISA/EPO—dated Jul. 12, 2019.

Samsung: "Corrections on CA Operation", 3GPP Draft; R1-1801989 CA Operation, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 26, 2018-Mar. 2, 2018, Feb. 17, 2018 (Feb. 17, 2018), pp. 1-9, XP051397785, Retrieved from the Internet: URL: http://www.3gpp.org/ftp/tsg_ran/WG1_RL1/TSGR1_92/Docs/ [retrieved on Feb. 17, 2018].

Samsung: "Second Offline Summary on CA Aspects", 3GPP Draft; R1-1803409 CA and UCI Offline 2, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 26, 2018-Mar. 2, 2018, Mar. 1, 2018 (Mar. 1, 2018), 9 Pages, XP051398632, Retrieved from the Internet: URL: http://www.3gpp.org/ftp/tsg_ran/WG1_RL1/TSGR1_92/Docs/ [retrieved on Mar. 1, 2018].

* cited by examiner

| PDSCH Mapping Type | Normal Cyclic Prefix | | |
|---|---|---|---|
| | $S$ | $L$ | $S+L$ |
| Type A | {0, 1, 2, 3} | {3, ... , 14} | {3, ... , 14} |
| Type B | {0, ..., 12} | {2, 4, 7} | {2, ... , 14} |

SEMI-STATIC HARQ-ACK CODEBOOK WITH MULTIPLE PDSCH TRANSMISSIONS PER SLOT

CLAIM OF PRIORITY UNDER 35 U.S.C. § 119

The present application for patent claims benefit of U.S. Provisional Patent Application Ser. No. 62/654,296, filed Apr. 6, 2018, assigned to the assignee hereof and hereby expressly incorporated by reference herein.

BACKGROUND

Field of the Disclosure

Aspects of the present disclosure relate generally to wireless communications systems, and more particularly, to acknowledging downlink transmissions using a codebook of limited size.

Description of Related Art

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more gNBs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A gNB or DU may communicate with a set of UEs on downlink channels (e.g., for transmissions from a base station or to a UE) and uplink channels (e.g., for transmissions from a UE to a gNB or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a network entity. The method generally includes providing, to a user equipment (UE), first signaling defining time domain resources for a number of physical downlink shared channel (PDSCH) candidates within a transmission time interval (TTI), providing second signaling scheduling the UE to receive at least two PDSCH transmissions according to the PDSCH candidates, determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, and processing ACK/NACK feedback, received from the UE, for the scheduled PDSCH transmissions according to the determination.

Certain aspects of the present disclosure provide a method for wireless communication by a user equipment (UE). The method generally includes receiving first signaling defining time domain resources for a number of physical downlink shared channel (PDSCH) candidates within a transmission time interval (TTI), receiving second signaling scheduling the UE to receive at least two PDSCH transmissions according to the PDSCH candidates, determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, and providing ACK/NACK feedback for the scheduled PDSCH transmissions according to the determination.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
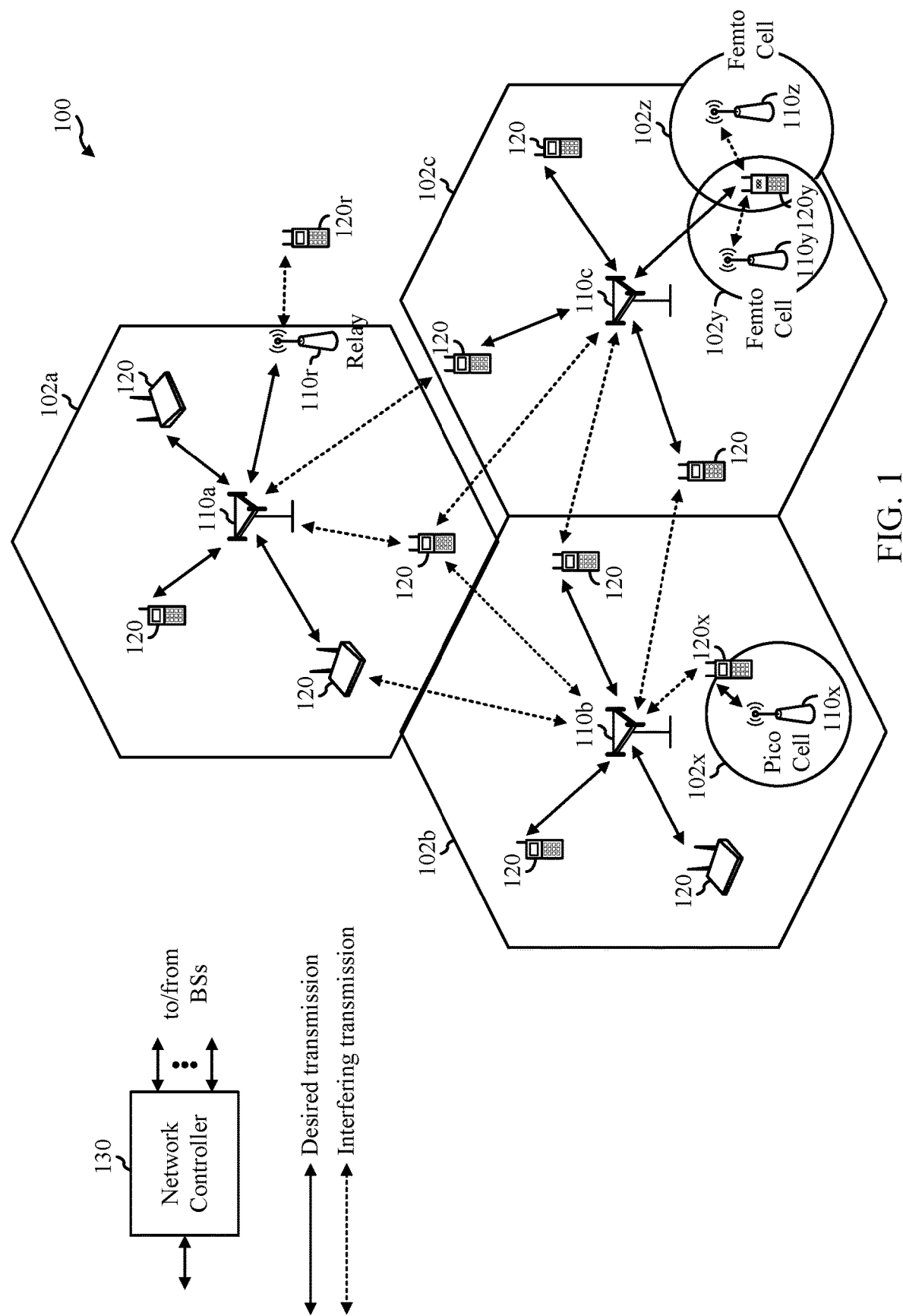
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., 3GPP Release-13 long term evolution (LTE) networks), enhanced machine type communications (eMTC) are supported, targeting low cost devices, often at the cost of lower throughput. eMTC may involve half-duplex (HD) operation in which uplink transmissions and downlink transmissions can both be performed—but not simultaneously. Some eMTC devices (e.g., eMTC UEs) may look at (e.g., be configured with or monitor) no more than around 1 MHz or six resource blocks (RBs) of bandwidth at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other cases, such as certain Internet-of-Things (IoT) use cases, wearables such as smart watches, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 100 may be a new radio (NR) or 5G network. A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a gNB 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the gNB 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of gNBs 110 and other network entities. A gNB may be a station that communicates with UEs. Each gNB 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile gNB. In some examples, the gNBs may be interconnected to one another and/or to one or more other gNBs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A gNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A gNB for a macro cell may be referred to as a macro gNB. A gNB for a pico cell may be referred to as a pico gNB. A gNB for a femto cell may be referred to as a femto gNB or a home gNB. In the example shown in FIG. 1, the gNBs 110a, 110b and 110c may be macro gNBs for the macro cells 102a, 102b and 102c, respectively. The gNB 110x may be a pico gNB for a pico cell 102x. The gNBs 110y and 110z may be femto gNB for the femto cells 102y and 102z, respectively. A gNB may support one or multiple (e.g., three) cells.

The wireless network 100 may also include relay stations. A relay station is a station that receives a transmission of data and/or other information from an upstream station (e.g., a gNB or a UE) and sends a transmission of the data and/or other information to a downstream station (e.g., a UE or a gNB). A relay station may also be a UE that relays transmissions for other UEs. In the example shown in FIG. 1, a relay station 110r may communicate with the gNB 110a and a UE 120r in order to facilitate communication between the gNB 110a and the UE 120r. A relay station may also be referred to as a relay gNB, a relay, etc.

The wireless network 100 may be a heterogeneous network that includes gNBs of different types, e.g., macro gNB, pico gNB, femto gNB, relays, etc. These different types of gNBs may have different transmit power levels, different coverage areas, and different impact on interference in the wireless network 100. For example, a macro gNB may have a high transmit power level (e.g., 20 Watts) whereas pico gNB, femto gNB, and relays may have a lower transmit power level (e.g., 1 Watt).

The wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. The techniques described herein may be used for both synchronous and asynchronous operation.

A network controller 130 may couple to a set of gNBs and provide coordination and control for these gNBs. The network controller 130 may communicate with the gNBs 110 via a backhaul. The gNBs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a gNB, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving gNB, which is a gNB designated to serve the UE on the downlink and/or uplink. A finely dashed line with double arrows indicates interfering transmissions between a UE and a gNB.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a gNB) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. gNBs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
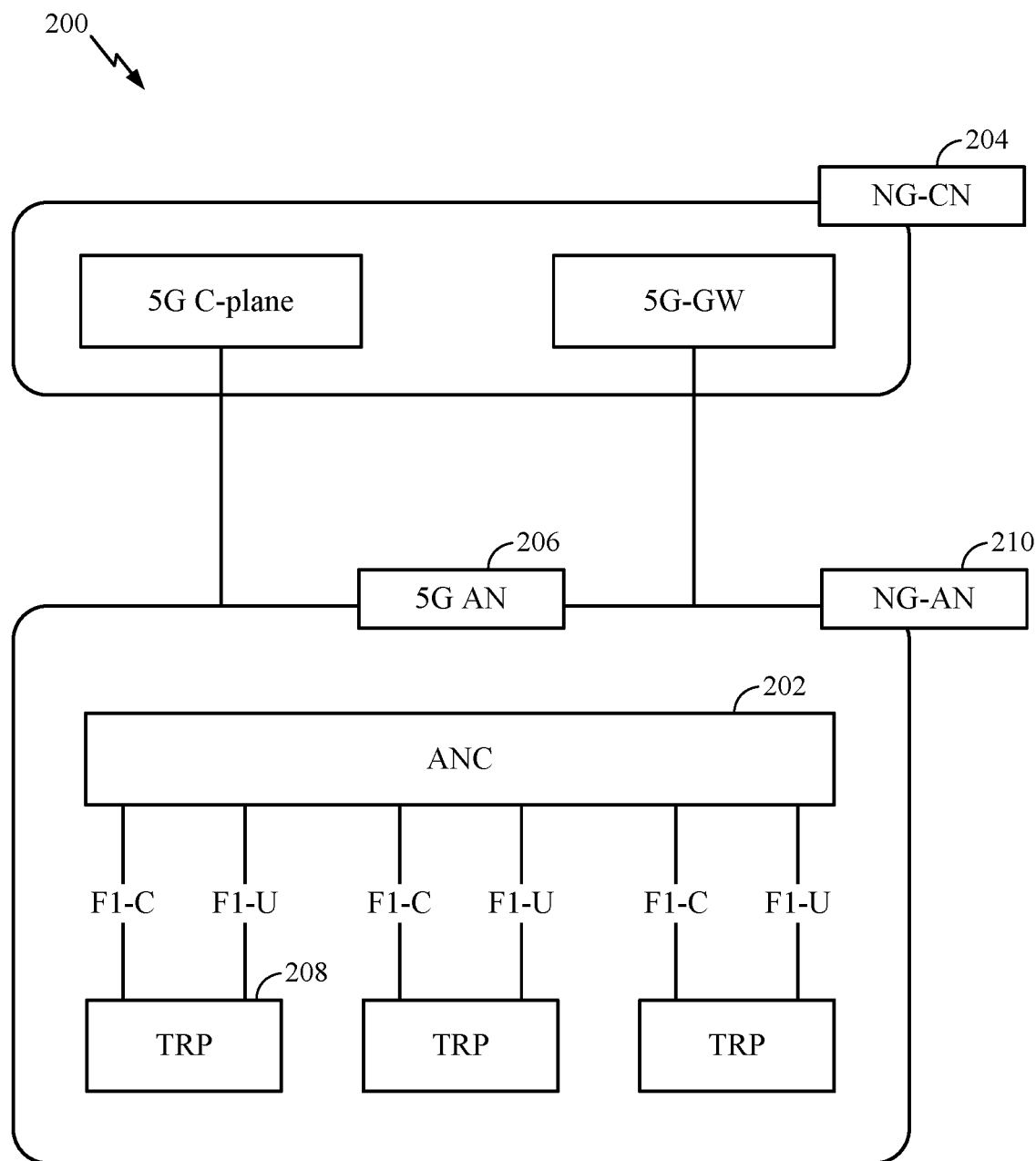
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, gNBs, or some other term).

The TRPs 208 may be a DU. The TRPs may be connected to one ANC (ANC 202) or more than one ANC (not illustrated). For example, for RAN sharing, radio as a service (RaaS), and service specific AND deployments, the TRP 208 may be connected to more than one ANC. A TRP may include one or more antenna ports. The TRPs may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may be present.

The logical architecture of the distributed RAN 200 may support a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
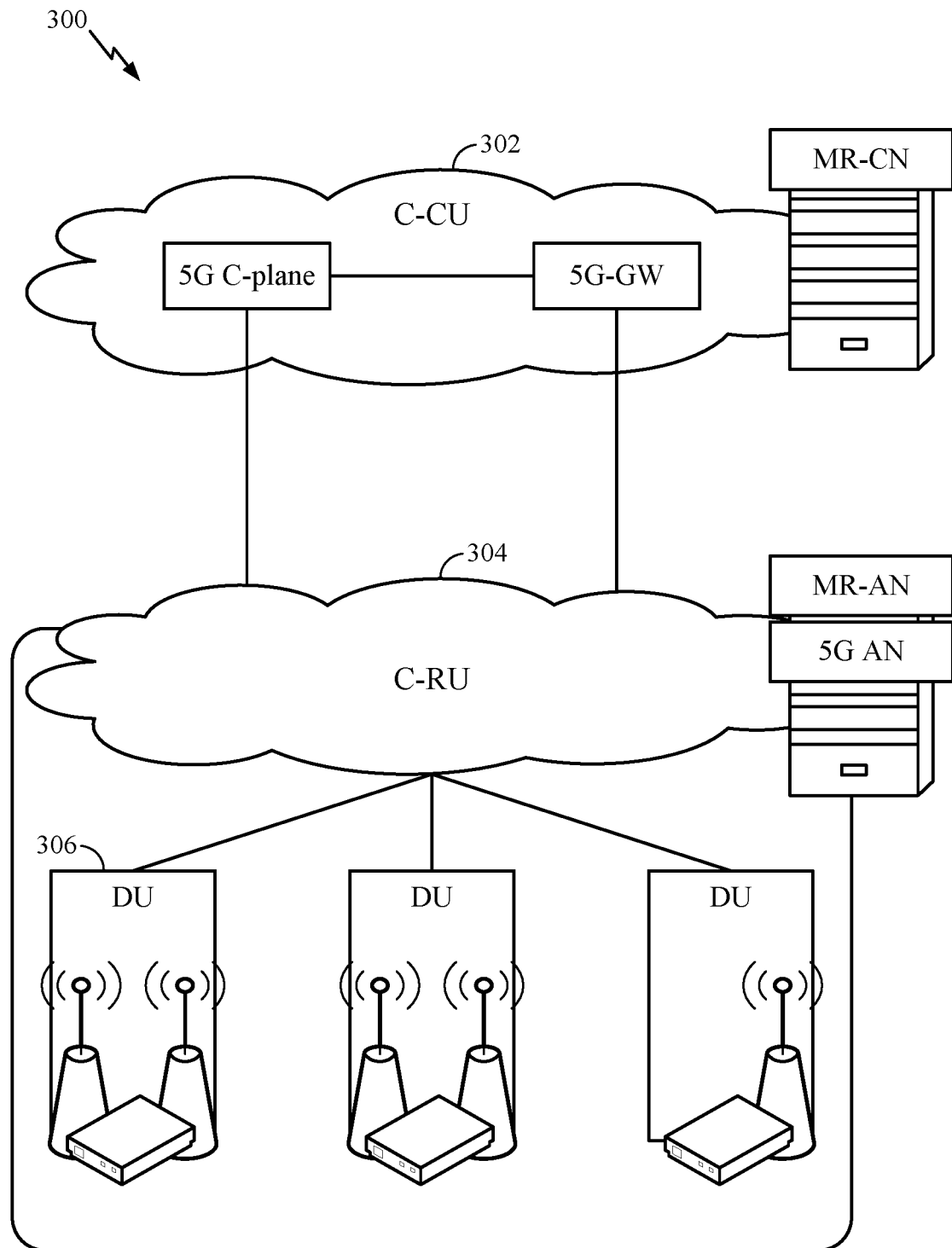
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be closer to the network edge.

A DU 306 may host one or more TRPs (e.g., an edge node (EN), an edge unit (EU), a radio head (RH), a smart radio head (SRH), or the like). The DU may be located at edges of the network with radio frequency (RF) functionality.

Figure 4:
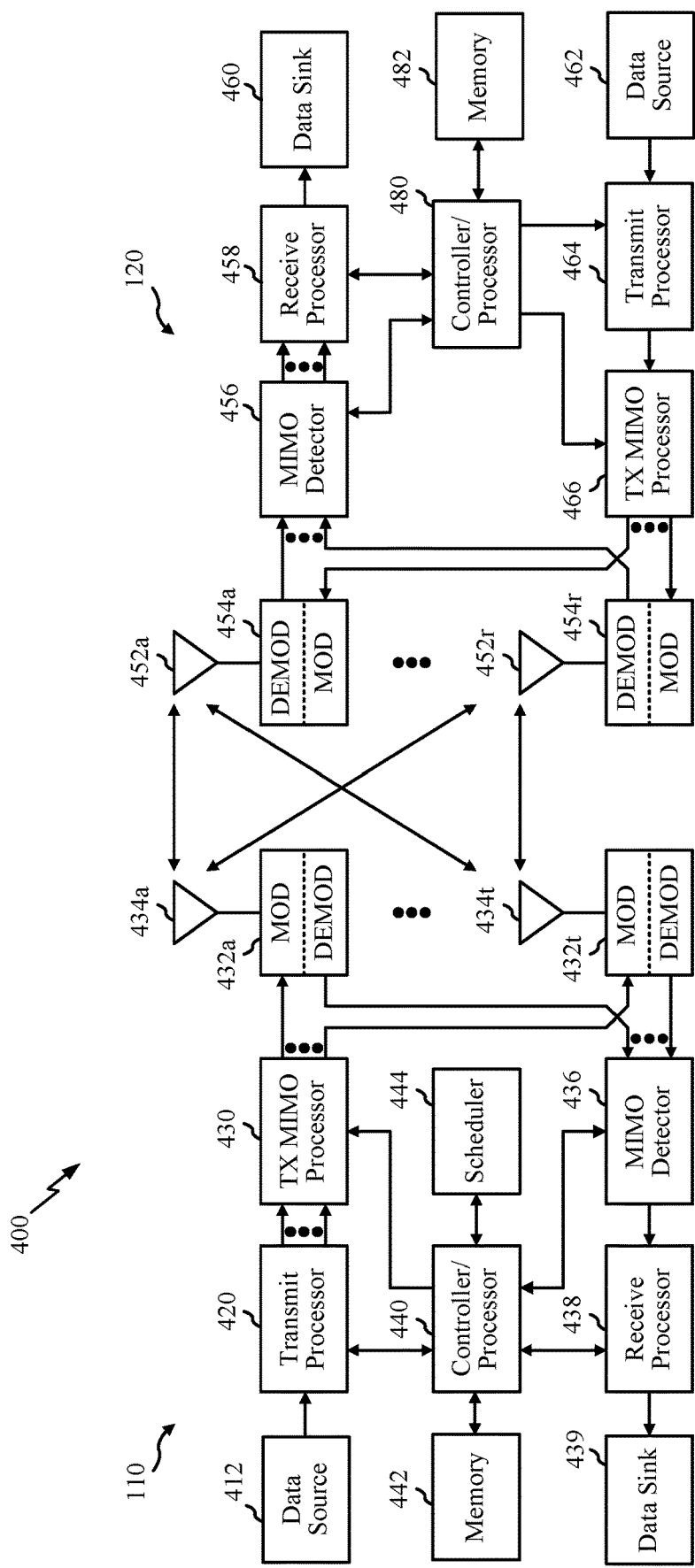
FIG. 4 is a block diagram conceptually illustrating a design of an example base station (BS) and user equipment (UE), in accordance with certain aspects of the present disclosure.

FIG. 4 illustrates example components of the gNB 110 and UE 120 illustrated in FIG. 1, which may be used to implement aspects of the present disclosure for frequency hopping for large bandwidth allocations. For example, antennas 452, Tx/Rx 222, processors 466, 458, 464, and/or controller/processor 480 of the UE 120 and/or antennas 434, processors 460, 420, 438, and/or controller/processor 440 of the gNB 110 may be used to perform the operations described herein and illustrated with reference to FIGS. 9-11.

FIG. 4 shows a block diagram of a design of a gNB 110 and a UE 120, which may be one of the gNBs and one of the UEs in FIG. 1. For a restricted association scenario, the gNB 110 may be the macro gNB 110c in FIG. 1, and the UE 120 may be the UE 120y. The gNB 110 may also be gNB of some other type. The gNB 110 may be equipped with antennas 434a through 434t, and the UE 120 may be equipped with antennas 452a through 452r.

At the gNB 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the gNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the gNB 110. At the gNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the gNB 110 and the UE 120, respectively. The processor 440 and/or other processors and modules at the gNB 110 may perform or direct, e.g., the execution of various processes for the techniques described herein. The processor 480 and/or other processors and modules at the UE 120 may also perform or direct, e.g., the execution of the functional blocks illustrated in FIGS. 9 and 11, and/or other processes for the techniques described herein. The processor 440 and/or other processors and modules at the gNB 110 may also perform or direct, e.g., the execution of the functional blocks illustrated in FIG. 10, and/or other processes for the techniques described herein. The memories 442 and 482 may store data and program codes for the gNB 110 and the UE 120, respectively. A scheduler 444 may schedule UEs for data transmission on the downlink and/or uplink.

Figure 5:
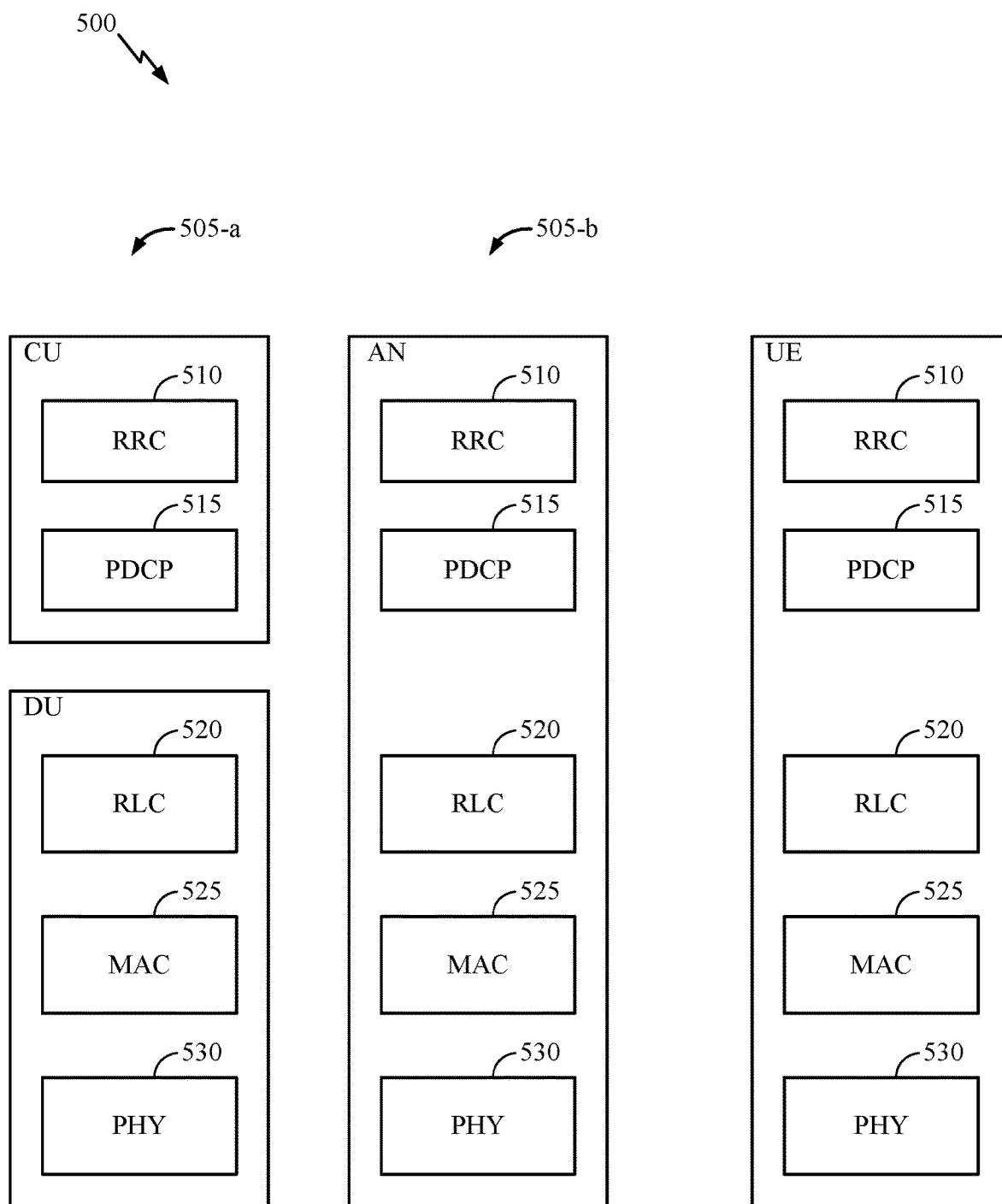
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
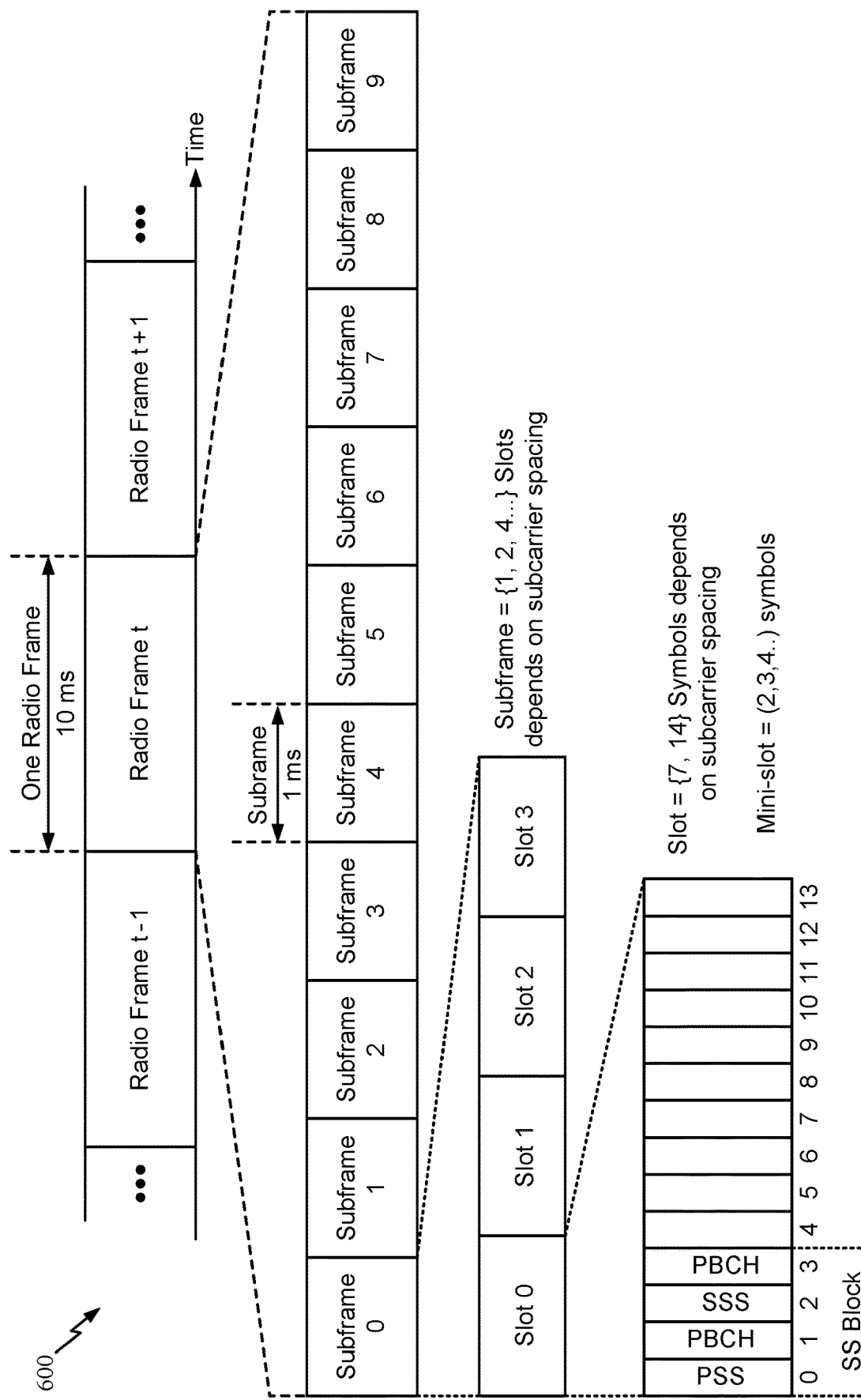
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

Example PDSCH Time Domain Resource Allocation (TDRA) Patterns

In certain systems, such as NR systems, when a UE is scheduled to receive a PDSCH transmission by a DCI, the DCI indicates resources for the PDSCH transmission. For example, a time-domain PDSCH resources field of the DCI may provide a row index of an RRC configured table (a PDSCH Symbol Allocation table), such as that shown in FIG. 7. Information in the indexed row defines the start and length indicator vector (SLIV) and the PDSCH mapping type to be assumed in the PDSCH reception. For example, the table shows allowable starting symbols S and allowable lengths L. For a normal cyclic prefix, each subframe with 14 symbols (2 slots×7 symbols/slot), so the maximum value of S+L is 14.

According to the table and DCI indication, the slot allocated for the PDSCH is determined by k0 (typically an integer 1, 2, or 3) of the indexed row n+k0, where n is the slot with the scheduling DCI, k0 is based on the numerology of PDSCH. The starting symbol S relative to [the start of the slot], and the number of consecutive symbols L counting from the symbol S allocated for the PDSCH are determined from the start and length indicator SLIV of the indexed row.

In some cases, a UE may be configured with a semi-static HARQ-ACK codebook, on a per cell basis. In such cases, if the UE indicates capability to receive more than one unicast PDSCH per slot, the UE assumes that the HARQ-ACK codebook size per-slot is determined by a maximum number of non-overlapping candidate unicast PDSCH occasions per slot. This maximum value may be determined by the SLIV in the configured PDSCH symbol allocation table. Otherwise, the UE may be expected to receive only one unicast PDSCH per slot, and a HARQ-ACK association set may assume one unicast PDSCH per slot. Handling HARQ-ACK for PDCCH transmissions for semi-persistently scheduled (SPS) release may follow the same approach as in LTE.

Figures 7, 8:
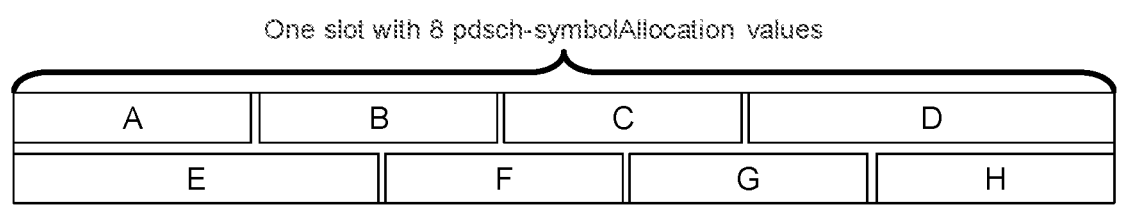
FIGS. 7 and 8 illustrate examples of allowable time domain resource allocation patterns for physical downlink shared channel (PDSCH) transmissions.

FIG. 8 illustrates an example of the possible time domain resource allocation patterns for PDSCH candidates within a single slot. In the illustration shown, there are 8 different time-domain allocation patterns within a slot. Each pattern corresponds to a sequence of allowable PDSCH candidates in accordance with the table of FIG. 7. For example, candidate A may correspond to a starting symbol S of 0 and a length L of 3, while candidate E may also corresponding to starting symbol S of 0, but a length L of 4. Downlink grant (non-fallback DCI 1_1) will indicate the choice of time-domain allocation.

In the illustrated example, the maximum number of non-overlapping candidates is 4 (which is achieved by A-B-C-D, A-F-G-H, and E-F-G-H). According to the assumption mentioned above, the HARQ-ACK codebook for each slot (determined based on the maximum number of non-overlapping candidates) will accommodate 4 ACK/NACKs.

Unfortunately, in case multiple PDSCHs are received at the UE, one challenge is presented as to how the UE should unambiguously convey (or "pack") the ACK/NACKs into the 4 ACK/NACK fields (0 ... 3) provided by the codebook to make the ACK/NACK signaling robust enough to accommodate grant-missing events.

This challenge may be described, with reference to FIG. 8, by considering PDSCH transmissions using candidates A and F are both received. Clearly, candidates A and E could be acknowledged using a first ACK/NACK field (0). Similarly, candidates D and H could be acknowledged using a last ACK/NACK field (3). However, since candidate F spans both candidate B and C, it is unclear whether the UE would use a second ACK/NACK field (1) or a third ACK/NACK field (2) to acknowledge candidate F.

This issue of potential ambiguity gets even more complicated if the ACK/NACK field size is limited (capped) to the maximum number of PDSCH transmissions that a UE could handle. For example, a UE may indicate it is only able to handle two PDSCH transmissions in one slot. This limit potentially presents more possible combinations of mapping ACK/NACK fields to PDSCH transmissions—as the UE may only acknowledge two PDSCH transmissions even if more than two are transmitted.

Aspects of the present disclosure provide mechanisms that may help reduce or eliminate the potential ACK/NACK ambiguity, described above, in the case of multiple PDSCH transmissions in a single slot.

Figure 9:
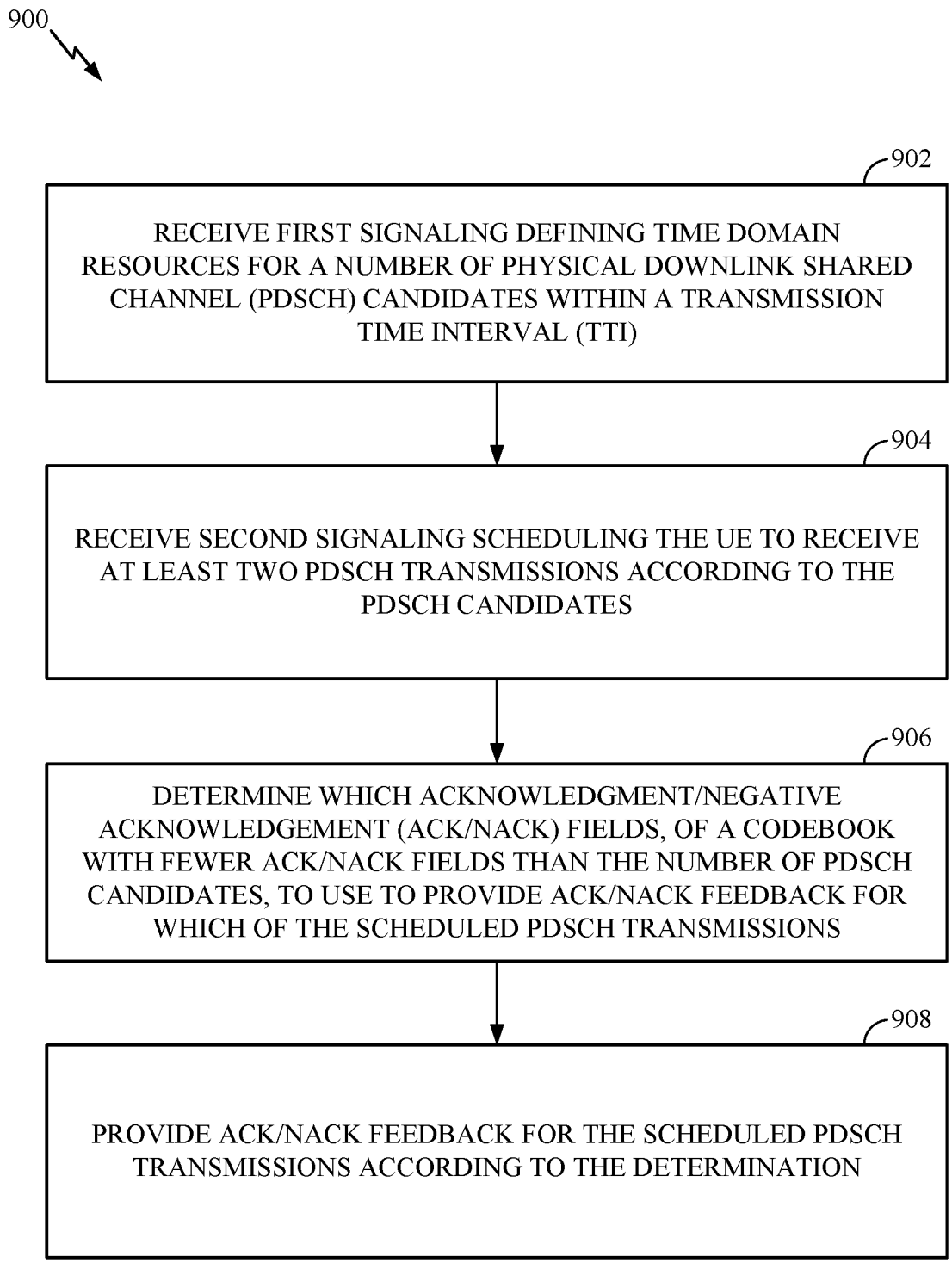
FIG. 9 illustrates example operations for wireless communication by a user-equipment (UE), in accordance with certain aspects of the present disclosure.

FIG. 9 illustrates example operations 900 that may be performed by a UE, in accordance with aspects of the present disclosure. For example, operations 900 may be performed by a UE 120 shown in FIG. 4, to determine how to provide ACK/NACK feedback for multiple PDSCH transmissions in a single TTI.

Operations 900 begin, at 902, by receiving first signaling defining time domain resources for a number of physical downlink shared channel (PDSCH) candidates within a transmission time interval (TTI). For example, this first signaling may include RRC signaling of a PDSCH symbol allocation table.

At 904, the UE receives second signaling scheduling the UE to receive at least two PDSCH transmissions according to the PDSCH candidates. For example, this second signaling may correspond to a time-domain PDSCH resources field of a DCI scheduling the PDSCH transmissions.

At 906, the UE determines which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions. For example, the UE may utilize one of various approaches described below to remove ambiguity in which ACK/NACK fields to use for a given set of PDSCH transmissions.

At 908, the UE provides ACK/NACK feedback for the scheduled PDSCH transmissions according to the determination.

Figure 10:
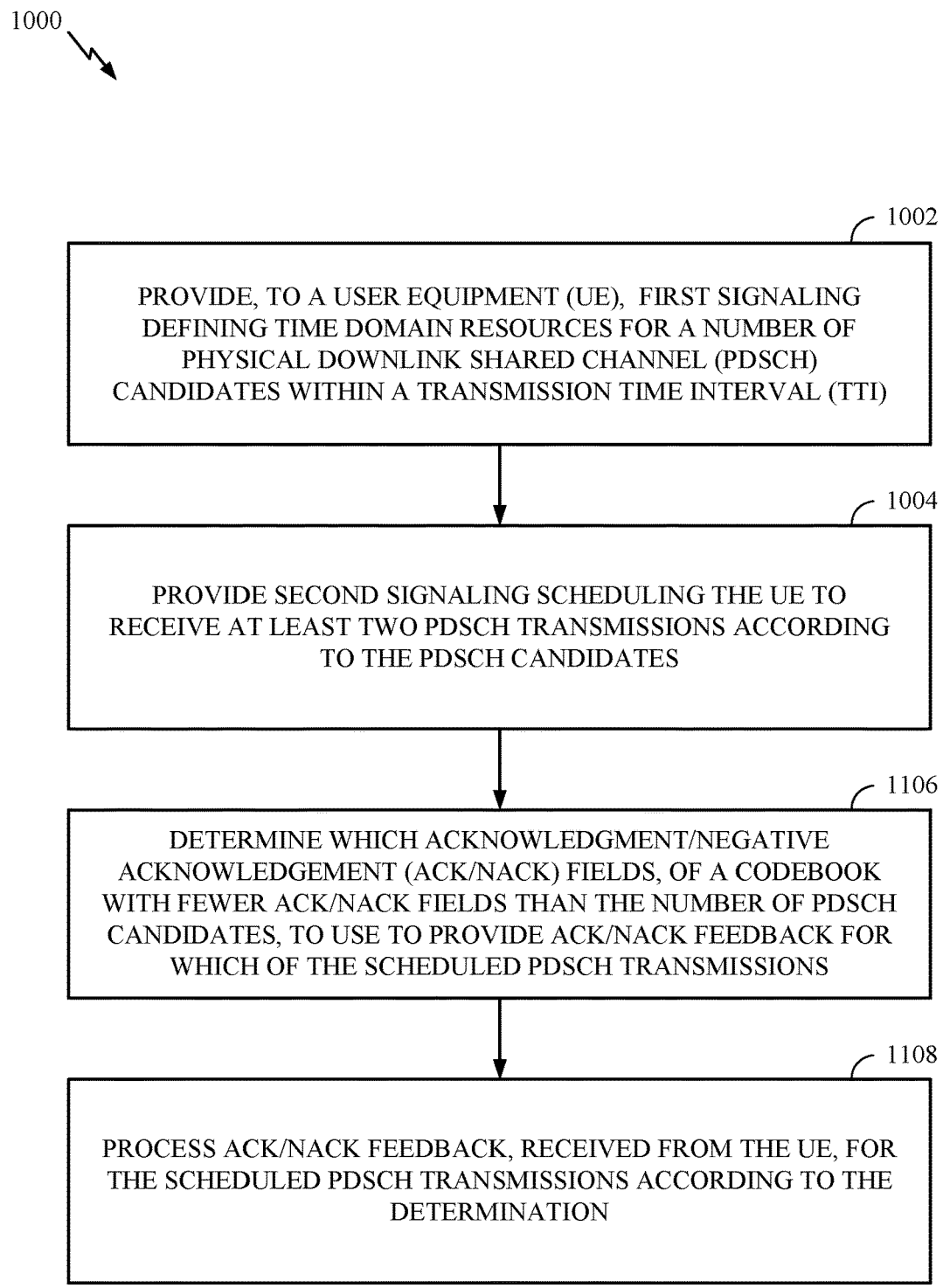
FIG. 10 illustrates example operations for wireless communication by a network entity, in accordance with certain aspects of the present disclosure.

FIG. 10 illustrates example operations 1000 that may be performed by a network entity, in accordance with aspects of the present disclosure. For example, operations 1000 may be performed by a base station 110 (e.g., a gNB) of FIG. 4 to send multiple PDSCH transmissions in a single TTI to a UE performing operations 900 of FIG. 9.

Operations 1000 begin, at 1002, by providing, to a user equipment (UE), first signaling defining time domain resources for a number of physical downlink shared channel (PDSCH) candidates within a transmission time interval (TTI). At 1004, the network entity provides second signaling scheduling the UE to receive at least two PDSCH transmissions according to the PDSCH candidates. As noted above, the first signaling may be RRC signaling of a PDSCH symbol allocation table, while the second signaling is via DCI scheduling the PDSCH transmissions.

At 1006, the network entity determines which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions. At 1008, the network entity processes ACK/NACK feedback, received from the UE, for the scheduled PDSCH transmissions according to the determination.

The present disclosure proposes various options may help reduce or eliminate potential ACK/NACK ambiguity in the case of multiple PDSCH transmissions in a single slot. By applying the same approach (rules) to resolving ambiguity as the UE, a network entity may be able to properly interpret the ACK/NACK feedback and act accordingly (e.g., retransmit one or more PDSCH in the case of a NACK).

Figure 11A:
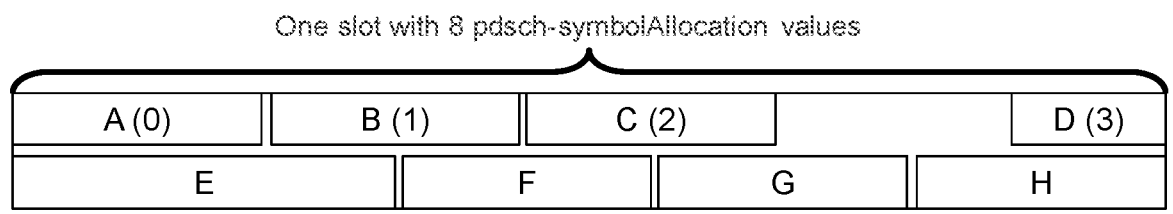
FIGS. 11A and 11B illustrate example techniques for mapping PDSCH candidates to ACK/NACK resources, in accordance with certain aspects of the present disclosure.

According to a first option, the UE (and gNB) may use a function (e.g., a hashing function) to map each symbol Allocation candidate (e.g., corresponding to candidates A, B ... H per FIG. 8B) to a location in the ACK/NACK fields. As an example, using a modulo 4 function as the hashing function, candidates A, B, C, and D could be mapped to ACK/NACK fields 0, 1, 2, and 3, respectively, as shown in FIG. 11A (where the number next to the letter indicates the ACK/NACK field that candidate is mapped to). Candidates E, F, G, and H, could be mapped similarly (e.g., E0, F1, G2, and H3) or using some other consideration as will be further discussed below.

According to another option, the PDSCH symbol Allocation candidates may be grouped into non-overlapping groups (e.g., the candidates in each group are non-overlapping). For example, again referring to FIG. 11A, the 8 candidates (A-F) can be grouped into 2 non-overlapping groups of four candidates: A,B,C,D and E,F,G,H. The mapping to ACK/NACK fields may then be performed, for example, according to the rank in its own group (which, coincidentally, would result in the same mapping described above).

In some cases, to avoid ambiguity, a scheduling rule may prevent PDSCH candidates from both the first and second groups from being scheduled in the same TTI. If a UE detects a violation of this rule it could treat it as an error-or bundle ACK/NACK information for the PDSCH candidates in a single field.

In some cases, information for grouping the PDSCH candidates may be conveyed implicitly. For example, as noted above, the RRC configuration may convey an allocation table with SLIV. Other parameters, such as k0/k2 (for slot timing indication), and PDSCH/PUSCH mapping type (e.g., A or B) may also be included in (piggybacked onto) the row entries.

For row entries corresponding to the same slot, whenever the starting symbol increments (increases) from one entry to the next (e.g., going from candidate A to B, from B to C, or from C to D), those two candidates may belong to the same group. On the other hand, whenever the starting symbol decrements (decreases) from one entry to the next (e.g., as when going from candidate D to E), it indicates the start of a new group.

In some cases, for grouping purposes, the direction of traversing the table could be specified, either from (i) small to large row index, or (ii) large to small row index (it may more likely as top of the table would likely be prioritized for Type A only). Type A and Type B refers to mapping algorithms, with Type A generally having more candidate options across a greater number of symbols. It may also be noted that PDSCH mapping Type A typically starts right after control region (while Type B includes the symbols of the control region), so the techniques provided herein may not be applied in the case of Type A (if mixed Type A and Type B allocation is not supported). However, mixed Type A and Type B allocation in the same slot may not be precluded.

If mixed Type A and Type B allocation is not supported, type-A (candidate) entries may be arranged at the beginning of the table (or arranged at the end of the table). As an alternative, Type A candidate entries could be located anywhere in the table and ignored when applying the mapping rules described herein.

According to still another option, a set of maximum non-overlapping symbol Allocation candidates may be selected and used as reference set. Each candidate in the reference set may then be mapped to an ACK/NACK field (e.g., as described above). For each candidate that is not in the reference set, that candidate may be mapped to an ACK/NACK field position of a reference candidate according to a rule. For example, the rule may dictate that a non reference set candidate is mapped to an ACK/NACK field corresponding to a candidate in the reference set if its starting symbol is within the duration of that reference candidate. This rule may be extended to map the non reference set candidate to the ACK/NACK field of the same reference candidate if its starting symbol falls before the start of that reference candidate in case there is time-domain gap between the reference candidate and its immediate succeeding one.

Figure 11B:
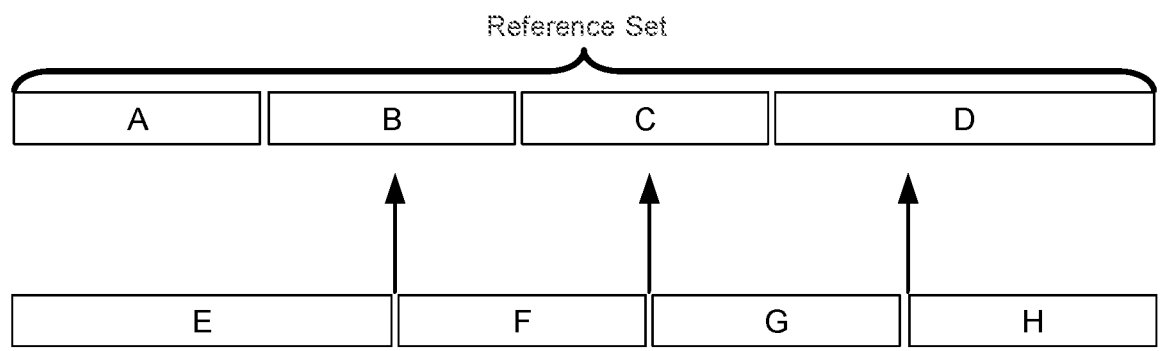

To illustrate the use of a reference set, FIG. 11B shows an example where candidates A,B,C,D are picked to form the maximum non-overlapping reference set. If non-reference PDSCH candidate F is received, its ACK/NACK will be transmitted in the same ACK/NACK field used for reference set candidate B (e.g., the second ACK/NACK field (1) assuming the same mapping shown in FIG. 11A).

In some cases, information for selecting the reference set of SLIV may be implicitly conveyed rather than separately signaling the reference set. For example, similarly as the way to convey grouping information described above, the reference set may be inferred by arranging the indexes of the reference set at the beginning of the RRC table, and the indexes may be enforced to be in incremental order as the starting symbol. Whenever the incremental order is violated, or an overlapping SLIV is detected, this may mark the end of the reference set. In other words, the reference set may be determined when, the starting symbol rolls back, when an overlapping entry is detected, or both.

Figure 12:
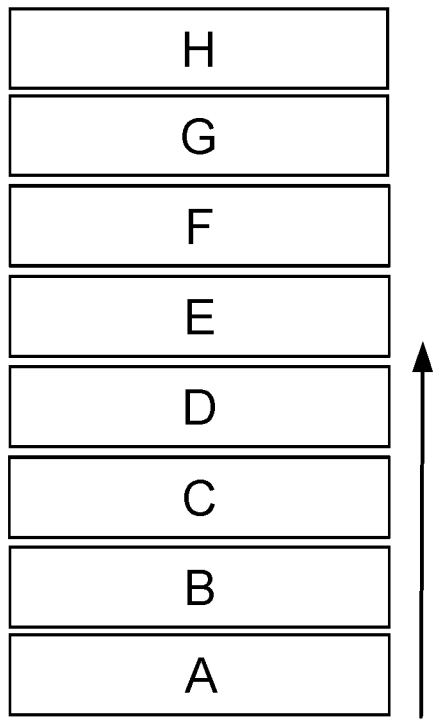
FIG. 12 illustrates an example traversal of a PDSCH symbol allocation table, in accordance with certain aspects of the present disclosure.

FIG. 12 illustrates how PDSCH symbol allocation table entries may be arranged to implicitly indicate a reference set. For table entries with a matching k0, the UE can expect non-overlapping candidates as it traverses the table in a specified direction (e.g. starting from the row with the largest index and going towards lower indexes as illustrated in FIG. 12). If the UE encounters a candidate that overlaps with any of the previously visited candidates, the UE may assume that the previously visited candidates constitute the reference set. In the example shown in FIG. 12, once the UE encounters candidate E, it determines this overlaps with a previous candidate (candidates A and B in the examples of FIGS. 11A and 11B) and concludes the reference set is A-B-C-D.

One reason to traverse a table in the direction shown in FIG. 12, from bottom to top, is that the top part of the table may be heavily populated by PDSCH mapping type A entries, which likely would not define the max number of non-overlapping candidates. In such cases, the top entries of the table would be more important for slot-based operation because a time-domain resource allocation (RA) field truncation rule for BWP switching results in heavier reliance on the top portion of the table.

In some cases, some form of contention resolution may be applied. For example, in the solutions presented herein, there may be cases where multiple candidates map to the same ACK/NACK allocation. In this case, ACK/NACK bundling may be used. For example, if two PDSCH candidates scheduled for the same time slot map to the same ACK/NACK field, the UE may indicate a positive acknowledgment in the corresponding ACK/NACK field only if both transmissions are successfully received (otherwise a negative acknowledgment may be indicated).

EXAMPLE EMBODIMENTS

Embodiment 1

A method for wireless communications by a user equipment (UE), including receiving first signaling defining time domain resources for a number of physical downlink shared channel (PDSCH) candidates within a transmission time interval (TTI), receiving second signaling scheduling the UE to receive at least two PDSCH transmissions according to the PDSCH candidates, determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, and providing ACK/NACK feedback for the scheduled PDSCH transmissions according to the determination.

Embodiment 2

The method of Embodiment 1, wherein the TTI comprises a time slot within a subframe or a portion of a time slot.

Embodiment 3

The method of any of Embodiments 1 or 2, wherein the number of ACK/NACK fields corresponds to a maximum number of non-overlapping PDSCH candidates per slot as defined by the first signaling.

Embodiment 4

The method of any of Embodiments 1 to 3, wherein the determination is performed only for a first type of PDSCH mapping, but not a second type of PDSCH mapping.

Embodiment 5

The method of any of Embodiments 1 to 4, further comprising, if the same ACK/NACK field is determined for more than one scheduled PDSCH candidate, bundling the corresponding ACK/NACK feedback for those PDSCH candidates.

Embodiment 6

The method of any of Embodiments 1 to 5, wherein the determination is based on a function that maps each PDSCH candidate to one of the ACK/NACK fields.

Embodiment 7

The method of Embodiment 6, wherein the function comprises a hashing function that takes a start and length indicator vector (SLIV) as an input and outputs a location corresponding to one of the ACK/NACK fields.

Embodiment 8

The method of any of Embodiments 1 to 7, further comprising grouping the PDSCH candidates into at least first and second groups of PDSCH candidates whose time domain resources do not overlap and wherein the determination of which ACK/NACK field to use for a given PDSCH candidate is based on a location of that PDSCH candidate within its group.

Embodiment 9

The method of Embodiment 8, wherein the first signaling conveys a table with entries corresponding to PDSCH candidates and a PDSCH candidate is grouped with another PDSCH candidate having a previous entry in the table if its starting symbol is increased relative to the starting symbol of the other PDSCH candidate.

Embodiment 10

The method of Embodiment 9, wherein a start of a new group is indicated when a starting symbol of a PDSCH candidate is decreased relative to the starting symbol of another PDSCH candidate having a previous entry in the table.

Embodiment 11

The method of any of Embodiments 8 or 9, wherein a scheduling rule prevents PDSCH candidates from both the first and second groups from being scheduled in the same TTI.

Embodiment 12

The method of any of Embodiments 1 to 11, further comprising picking, as a reference set, a maximum number of non-overlapping PDSCH candidates per slot as defined by the first signaling, wherein each PDSCH candidate in the set is mapped to one of the ACK/NACK fields and for each PDSCH candidate not in the reference set, mapping that PDSCH candidate to an ACK/NACK field of a PDSCH candidate in the reference set if that PDSCH candidate starting symbol is: within a duration of the PDSCH candidate in the reference set or occurs in a gap between the PDSCH candidate in the reference set and the end of a previous PDSCH candidate in the reference set.

Embodiment 13

The method of any of Embodiments 1 to 12, wherein the first signaling conveys a table with entries corresponding to PDSCH candidates and the reference set is obtained based on the order of occurrence of entries in the table.

Embodiment 14

The method of any of Embodiments 1 to 13, wherein an end of the reference set is indicated when a starting symbol of a PDSCH candidate is decreased relative to the starting symbol of another PDSCH candidate having a previous entry in the table.

Embodiment 15

The method of any of Embodiments 1 to 14, wherein a scheduling rule prevents PDSCH candidates from both the reference set and outside the reference set from being scheduled in the same TTI.

Embodiment 16

A method for wireless communications by a network entity, including providing, to a user equipment (UE), first signaling defining time domain resources for a number of physical downlink shared channel (PDSCH) candidates within a transmission time interval (TTI), providing second signaling scheduling the UE to receive at least two PDSCH transmissions according to the PDSCH candidates, determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, and processing ACK/NACK feedback, received from the UE, for the scheduled PDSCH transmissions according to the determination.

Embodiment 17

The method of Embodiment 16, wherein the TTI comprises a time slot within a subframe or a portion of a time slot.

Embodiment 18

The method of any of Embodiments 16 or 17, wherein the number of ACK/NACK fields corresponds to a maximum number of non-overlapping PDSCH candidates per slot as defined by the first signaling.

Embodiment 19

The method of any of Embodiments 16 to 18, wherein the determination is performed only for a first type of PDSCH mapping, but not a second type of PDSCH mapping.

Embodiment 20

The method of any of Embodiments 16 to 19, further comprising, determining that, if the same ACK/NACK field is determined for more than one scheduled PDSCH candidate, the UE bundled the corresponding ACK/NACK feedback for those PDSCH candidates.

Embodiment 21

The method of any of Embodiments 16 to 20, wherein the determination is based on a function that maps each PDSCH candidate to one of the ACK/NACK fields.

Embodiment 22

The method of Embodiment 21, wherein the function comprises a hashing function that takes a start and length indicator vector (SLIV) as an input and outputs a location corresponding to one of the ACK/NACK fields.

Embodiment 23

The method of any of Embodiments 16 to 22, further comprising grouping the PDSCH candidates into at least first and second groups of PDSCH candidates whose time domain resources do not overlap and wherein the determination of which ACK/NACK field to use for a given PDSCH candidate is based on a location of that PDSCH candidate within its group.

Embodiment 24

The method of Embodiment 23, wherein the first signaling conveys a table with entries corresponding to PDSCH candidates and a PDSCH candidate is grouped with another PDSCH candidate having a previous entry in the table if its starting symbol is increased relative to the starting symbol of the other PDSCH candidate.

Embodiment 25

The method of any of Embodiments 23 to 24, wherein a start of a new group is indicated when a starting symbol of a PDSCH candidate is decreased relative to the starting symbol of another PDSCH candidate having a previous entry in the table.

Embodiment 26

The method of any of Embodiments 23 to 25, further comprising avoiding scheduling PDSCH candidates from both the first and second groups in the same TTI.

Embodiment 27

The method of any of Embodiments 23 to 26, further comprising picking, as a reference set, a maximum number of non-overlapping PDSCH candidates per slot as defined by the first signaling, wherein each PDSCH candidate in the set is mapped to one of the ACK/NACK fields and for each PDSCH candidate not in the reference set, mapping that PDSCH candidate to an ACK/NACK field of a PDSCH candidate in the reference set if that PDSCH candidate starting symbol is: within a duration of the PDSCH candidate in the reference set or occurs in a gap between the PDSCH candidate in the reference set and the end of a previous PDSCH candidate in the reference set.

Embodiment 28

The method of Embodiment 27, wherein the first signaling conveys a table with entries corresponding to PDSCH candidates and the reference set is obtained based on the order of occurrence of entries in the table.

Embodiment 29

The method of any of Embodiments 27 to 28, wherein an end of the reference set is indicated when a starting symbol of a PDSCH candidate is decreased relative to the starting symbol of another PDSCH candidate having a previous entry in the table.

Embodiment 30

The method of any of Embodiments 27 to 29, further comprising avoiding scheduling PDSCH candidates from both the reference set and outside the reference set in the same TTI.

Embodiment 31

An apparatus for wireless communications by a user equipment (UE), comprising means for receiving first signaling defining time domain resources for a number of physical downlink shared channel (PDSCH) candidates within a transmission time interval (TTI), means for receiving second signaling scheduling the UE to receive at least two PDSCH transmissions according to the PDSCH candidates, means for determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, and means for providing ACK/NACK feedback for the scheduled PDSCH transmissions according to the determination.

Embodiment 32

An apparatus for wireless communications by a network entity, comprising means for providing, to a user equipment (UE), first signaling defining time domain resources for a number of physical downlink shared channel (PDSCH) candidates within a transmission time interval (TTI), means for providing second signaling scheduling the UE to receive at least two PDSCH transmissions according to the PDSCH candidates, means for determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, and means for processing ACK/NACK feedback, received from the UE, for the scheduled PDSCH transmissions according to the determination.

Embodiment 33

A computer readable medium having instructions stored thereon for receiving first signaling defining time domain resources for a number of physical downlink shared channel (PDSCH) candidates within a transmission time interval (TTI), receiving second signaling scheduling the UE to receive at least two PDSCH transmissions according to the PDSCH candidates, determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, and providing ACK/NACK feedback for the scheduled PDSCH transmissions according to the determination.

Embodiment 34

A computer readable medium having instructions stored thereon for providing, to a user equipment (UE), first signaling defining time domain resources for a number of physical downlink shared channel (PDSCH) candidates within a transmission time interval (TTI), providing second signaling scheduling the UE to receive at least two PDSCH transmissions according to the PDSCH candidates, determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, and processing ACK/NACK feedback, received from the UE, for the scheduled PDSCH transmissions according to the determination.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving first signaling defining time domain resources for a number of physical downlink shared channel (PDSCH) candidates within a transmission time interval (TTI);
   receiving second signaling scheduling the UE to receive at least two PDSCH transmissions according to the PDSCH candidates;
   determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, wherein the determination comprises:
      determining whether at least one PDSCH candidate overlaps in time with at least two other PDSCH candidates;
      picking, as a reference set, a maximum number of non-overlapping PDSCH candidates per slot as defined by the first signaling, wherein each PDSCH candidate in the reference set is mapped to one of the ACK/NACK fields;
      for each PDSCH candidate not in the reference set, mapping that PDSCH candidate to an ACK/NACK field of a PDSCH candidate in the reference set when that PDSCH candidate starting symbol is:
         within a duration of the PDSCH candidate in the reference set or occurs in a gap between the PDSCH candidate in the reference set and the end of a previous PDSCH candidate in the reference set; and
   providing ACK/NACK feedback for the scheduled PDSCH transmissions according to the determination.

2. The method of claim 1, wherein the TTI comprises a time slot within a subframe or a portion of a time slot.

3. The method of claim 1, further comprising, if the same ACK/NACK field is determined for more than one scheduled PDSCH candidate, bundling the corresponding ACK/NACK feedback for those PDSCH candidates.

4. The method of claim 1, wherein the determination is based on a function that maps each PDSCH candidate to one of the ACK/NACK fields.

5. The method of claim 4, wherein the function comprises a hashing function that takes a start and length indicator vector (SLIV) as an input and outputs a location corresponding to one of the ACK/NACK fields.

6. The method of claim 1, further comprising:
   grouping the PDSCH candidates into at least first and second groups of PDSCH candidates whose time domain resources do not overlap; and
   wherein the determination of which ACK/NACK field to use for a given PDSCH candidate is based on a location of that PDSCH candidate within its group.

7. The method of claim 6, wherein a scheduling rule prevents PDSCH candidates from both the first and second groups from being scheduled in the same TTI.

8. The method of claim 1, wherein:
the first signaling conveys a table with entries corresponding to PDSCH candidates; and
the reference set is obtained based on the order of occurrence of entries in the table.

9. A method for wireless communications by a network entity, comprising:
providing, to a user equipment (UE), first signaling defining time domain resources for a number of physical downlink shared channel (PDSCH) candidates within a transmission time interval (TTI);
providing second signaling scheduling the UE to receive at least two PDSCH transmissions according to the PDSCH candidates;
determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, wherein the determination comprises:
determining whether at least one PDSCH candidate overlaps in time with at least two other PDSCH candidates;
picking, as a reference set, a maximum number of non-overlapping PDSCH candidates per slot as defined by the first signaling, wherein each PDSCH candidate in the reference set is mapped to one of the ACK/NACK fields; and
for each PDSCH candidate not in the reference set, mapping that PDSCH candidate to an ACK/NACK field of a PDSCH candidate in the reference set when that PDSCH candidate starting symbol is:
within a duration of the PDSCH candidate in the reference set or occurs in a gap between the PDSCH candidate in the reference set and the end of a previous PDSCH candidate in the reference set; and
processing ACK/NACK feedback, received from the UE, for the scheduled PDSCH transmissions according to the determination.

10. The method of claim 9, wherein the TTI comprises a time slot within a subframe or a portion of a time slot.

11. The method of claim 9, further comprising, determining that, if the same ACK/NACK field is determined for more than one scheduled PDSCH candidate, the UE bundled the corresponding ACK/NACK feedback for those PDSCH candidates.

12. The method of claim 9, wherein the determination is based on a function that maps each PDSCH candidate to one of the ACK/NACK fields.

13. The method of claim 12, wherein the function comprises a hashing function that takes a start and length indicator vector (SLIV) as an input and outputs a location corresponding to one of the ACK/NACK fields.

14. The method of claim 9, further comprising:
grouping the PDSCH candidates into at least first and second groups of PDSCH candidates whose time domain resources do not overlap; and
wherein the determination of which ACK/NACK field to use for a given PDSCH candidate is based on a location of that PDSCH candidate within its group.

15. The method of claim 14, further comprising avoiding scheduling PDSCH candidates from both the first and second groups in the same TTI.

16. The method of claim 9, wherein:
the first signaling conveys a table with entries corresponding to PDSCH candidates; and
the reference set is obtained based on the order of occurrence of entries in the table.

17. An apparatus for wireless communications by a user equipment (UE), comprising:
means for receiving first signaling defining time domain resources for a number of physical downlink shared channel (PDSCH) candidates within a transmission time interval (TTI);
means for receiving second signaling scheduling the UE to receive at least two PDSCH transmissions according to the PDSCH candidates;
means for determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, wherein the means for determining comprises:
means for determining whether at least one PDSCH candidate overlaps in time with at least two other PDSCH candidates;
means for picking, as a reference set, a maximum number of non-overlapping PDSCH candidates per slot as defined by the first signaling, wherein each PDSCH candidate in the reference set is mapped to one of the ACK/NACK fields; and
for each PDSCH candidate not in the reference set, means for mapping that PDSCH candidate to an ACK/NACK field of a PDSCH candidate in the reference set when that PDSCH candidate starting symbol is:
within a duration of the PDSCH candidate in the reference set or occurs in a gap between the PDSCH candidate in the reference set and the end of a previous PDSCH candidate in the reference set; and
means for providing ACK/NACK feedback for the scheduled PDSCH transmissions according to the determination.

18. The apparatus of claim 17, wherein the determination is based on a function that maps each PDSCH candidate to one of the ACK/NACK fields.

19. The apparatus of claim 17, further comprising:
means for grouping the PDSCH candidates into at least first and second groups of PDSCH candidates whose time domain resources do not overlap; and
wherein the determination of which ACK/NACK field to use for a given PDSCH candidate is based on a location of that PDSCH candidate within its group.

20. An apparatus for wireless communications by a network entity, comprising:
means for providing, to a user equipment (UE), first signaling defining time domain resources for a number of physical downlink shared channel (PDSCH) candidates within a transmission time interval (TTI);
means for providing second signaling scheduling the UE to receive at least two PDSCH transmissions according to the PDSCH candidates;
means for determining which acknowledgment/negative acknowledgement (ACK/NACK) fields, of a codebook with fewer ACK/NACK fields than the number of PDSCH candidates, to use to provide ACK/NACK feedback for which of the scheduled PDSCH transmissions, wherein the means for determining comprises:

means for determining whether at least one PDSCH candidate overlaps in time with at least two other PDSCH candidates;

means for picking, as a reference set, a maximum number of non-overlapping PDSCH candidates per slot as defined by the first signaling, wherein each PDSCH candidate in the reference set is mapped to one of the ACK/NACK fields; and for each PDSCH candidate not in the reference set, means for mapping that PDSCH candidate to an ACK/NACK field of a PDSCH candidate in the reference set when that PDSCH candidate starting symbol is:

within a duration of the PDSCH candidate in the reference set or occurs in a gap between the PDSCH candidate in the reference set and the end of a previous PDSCH candidate in the reference set; and means for processing ACK/NACK feedback, received from the UE, for the scheduled PDSCH transmissions according to the determination.

21. The apparatus of claim 20, wherein the determination is based on a function that maps each PDSCH candidate to one of the ACK/NACK fields.

22. The apparatus of claim 20, further comprising:

means for grouping the PDSCH candidates into at least first and second groups of PDSCH candidates whose time domain resources do not overlap; and wherein the determination of which ACK/NACK field to use for a given PDSCH candidate is based on a location of that PDSCH candidate within its group.

* * * * *